United States Patent Office 3,554,760
Patented Jan. 12, 1971

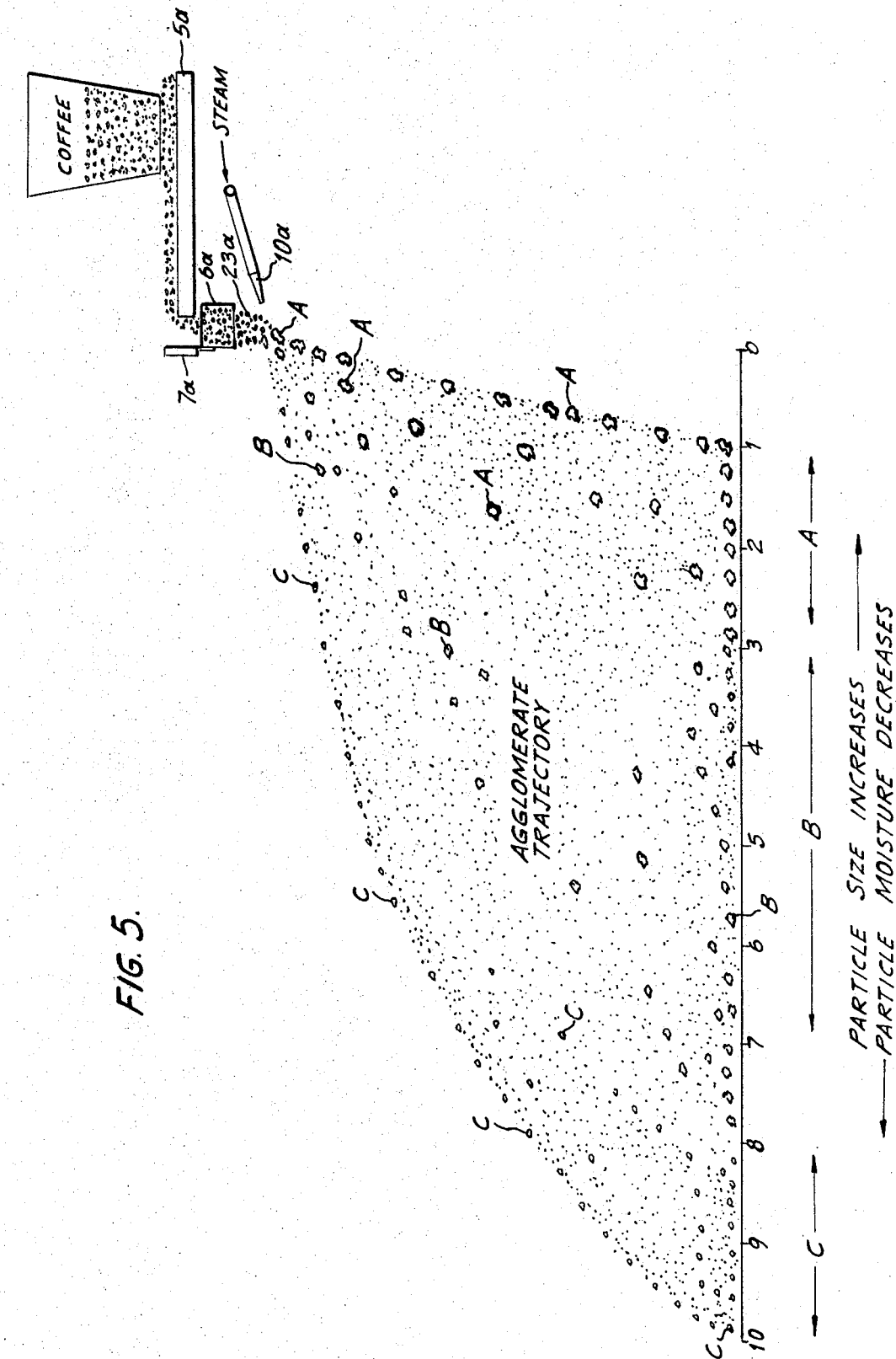

3,554,760
METHOD OF AGGLOMERATING FOOD POWDER
Boleslaw Sienkiewicz, Pearl River, and Ferdinand A. Bagley, Scotia, N.Y., assignors to General Foods Corporation, White Plains, N.Y.
Filed Dec. 26, 1967, Ser. No. 693,503
Int. Cl. A23f 1/08; B01j 2/00
U.S. Cl. 99—71                                        17 Claims

ABSTRACT OF THE DISCLOSURE

A process and apparatus for agglomeration of powders, especially soluble coffee, involving the use of upper and lower jets of steam which impinge against at least one falling curtain of powder at a substantial angle so as to disrupt said curtain into agglomerates which are then wetted and redirected into a drying zone. The purpose of the upper jets of steam is to form agglomerates of varying size, density, and moisture content whereas the purpose of the lower jets of steam is to further wet the agglomerates and render them more uniform in density, size and moisture content while insuring that all of said agglomerates are projected into the drying zone.

BACKGROUND OF THE INVENTION

This invention relates to an improvement in the art of agglomerating powders according to the technique described in Sienkiewicz et al. 2,977,203 wherein a falling curtain of powder is projected in a horizontal direction while being wet and agglomerated and, more particularly, to an improvement in the art of agglomerating coffee by the fusion technique first described in co-pending Ser. No. 528,770, filed Feb. 21, 1966 in the names of Billy Kan and Saul N. Katz.

In the Kan et al. application, a process is described for forming strong coffee agglomerates (as distinguished from the weak coffee agglomerates of the prior art) by raising the temperature of the wet coffee agglomerates to above the fusion point of the coffee solids thereby, in effect, forming at least partially melted or fused coffee agglomerates as distinguished from a merely dried solution of dissolved coffee solids in agglomerate form. Fusion of the coffee agglomerates is accomplished by increasing the moisture content at the surface of the coffee particles during agglomeration. Kan et al. stressed that the increase in moisture is necessary to lower the fusion or thermoplastic point of the coffee to a temperature range where fusion occurs without harming coffee flavor. This increase in surface moisture of the particles was accomplished by Kan et al. using steam to wet the coffee and then maintained by using a humidified atmosphere for drying the coffee agglomerates, thus giving more time for the coffee to fuse during drying. However, humidified air drying is difficult to use under commercial conditions and it would be desirable if a simpler or more practical method and apparatus were made available for obtaining fused coffee agglomerates.

SUMMARY OF THE INVENTION

It has now been discovered that a process and apparatus can be provided for producing relatively strong agglomerates of powdered material, such as coffee, by dropping a vertical curtain of powder into a steam zone where it can be disrupted into wet agglomerates and redirected in a horizontal direction into a drying zone by having upper and lower jets of steam positioned in this steaming zone at a substantial angle to the falling curtain of powder. The function of the upper steam jet or jets is to disrupt the falling curtain of powder into wet agglomerates of varying size, density and moisture content while the function of the lower jet or or jets of steam involves making the wet agglomerates more uniform in size, density and moisture content. The upper and lower jets of steam can be adjusted according to known variables (angles, pressure, temperature, steam-powder feed ratio, etc.) in order to achieve optimum conditions whereby the lower jet or jets of steam act chiefly on the undesirable or weakly-formed agglomerates formed by the upper jet or jets of steam to thereby greatly improve the yield of strong agglomerates in the desired particle size range. By controlling the initial particle size (pre-grinding), moisture content and temperature (pre-chilling) of the powdered material to be agglomerated, agglomerates can be achieved with predetermined properties in regard to density, color, flowability, strength, and particle appearance.

In the case of soluble coffee powder, it has been found that agglomerates of increased strength and more uniform size can be achieved by agglomerating said coffee under conditions whereby 2–6% of added moisture is distributed uniformly on the surfaces of the agglomerated particles to give a surface moisture as high as 10–15%, while the average moisture content may be only 5–10% and then fuse these agglomerates at a product temperature of below 250° F., say between 100° to 200° F. by contact with hot air having an inlet temperature of between 300° and 600° F. The high moisture content at the surfaces of the coffee agglomerate enables fusion to occur at lower product temperatures while avoiding flavor degradation by preventing the temperature of the product from exceeding the wet bulb temperature of the drying air. The fused agglomerates can then be dried at milder temperatures of 150° to 300° F. without hurting coffee flavor. This process is made practical by the use of upper and lower steam jets which operate at steam pressures of 5–30 p.s.i.g. to form properly wet agglomerates at a steam to powder ratio in pounds per hour of between 0.4:1 to 1.2:1. Pregrinding, prechilling, and use of a vibratory feed box providing parallel, spaced sheets to the upper and lower jets of steam are all used to advantage in assuring a high moisture suitable for fusion-agglomeration of the coffee when contacted with hot air. The fused-agglomerates then require only a drying step under milder air temperatures followed by post-cooling to set the warm agglomerates and prevent caking.

The use of higher initial moistures in the powdered coffee feed enables relatively high inlet temperatures to be used which would normally hurt the flavor of soluble coffee. Thus, while coffee with a normal moisture of 2–3% cannot contact inlet air temperatures of above 500° F. without some flavor degradation, if the coffee is prewet to about 5–6% moisture level or dried to this higher terminal moisture, it can then be contacted with inlet air temperatures of 500°–600° F. giving rapid fusion of the agglomerates without danger of flavor degradation.

The apparatus for achieving these beneficial results are shown in the drawings and include the use of a vibrating feeder means having a series of parallel slits into which the coffee powder falls in a series of vertical parallel curtains which are then impinged by upper and lower steam jets at a substantial angle in regard to the vertical plane of said curtains, the steam jets being released by steam pipes or nozzles arranged directly beneath the feeder means, the agglomerates of powder being then projected into a large drying chamber with the inlet air for drying being positioned sufficiently distant from the steam zone and controlled within certain limits to prevent premature evaporation of the steam prior to wetting and agglomerating the particles of coffee.

The angle of the steam jets is important in controlling the properties of the agglomerate. The upper jets are positioned so that they tilt slightly downward at an angle of 1° to 20° from the horizontal and the plane of the steam from the jets forms an angle of 70° to 89° with the falling curtain of powder at the point where the two streams meet while the lower jets are positioned slightly downward (0° to 30° from the horizontal) or slightly upward (0° to 10° from the horizontal).

BRIEF DESCRIPTION OF THE DRAWINGS

FIG. 4 is a still further enlarged perspective view showing the double row of steam nozzles and their arrangement in regard to the vibratory feeder.

FIG. 5 is a side view showing the typical trajectory of agglomerated particles as they are contacted by steam from a single row of steam nozzles.

DETAILED DESCRIPTION OF THE DRAWINGS

Figure 1:
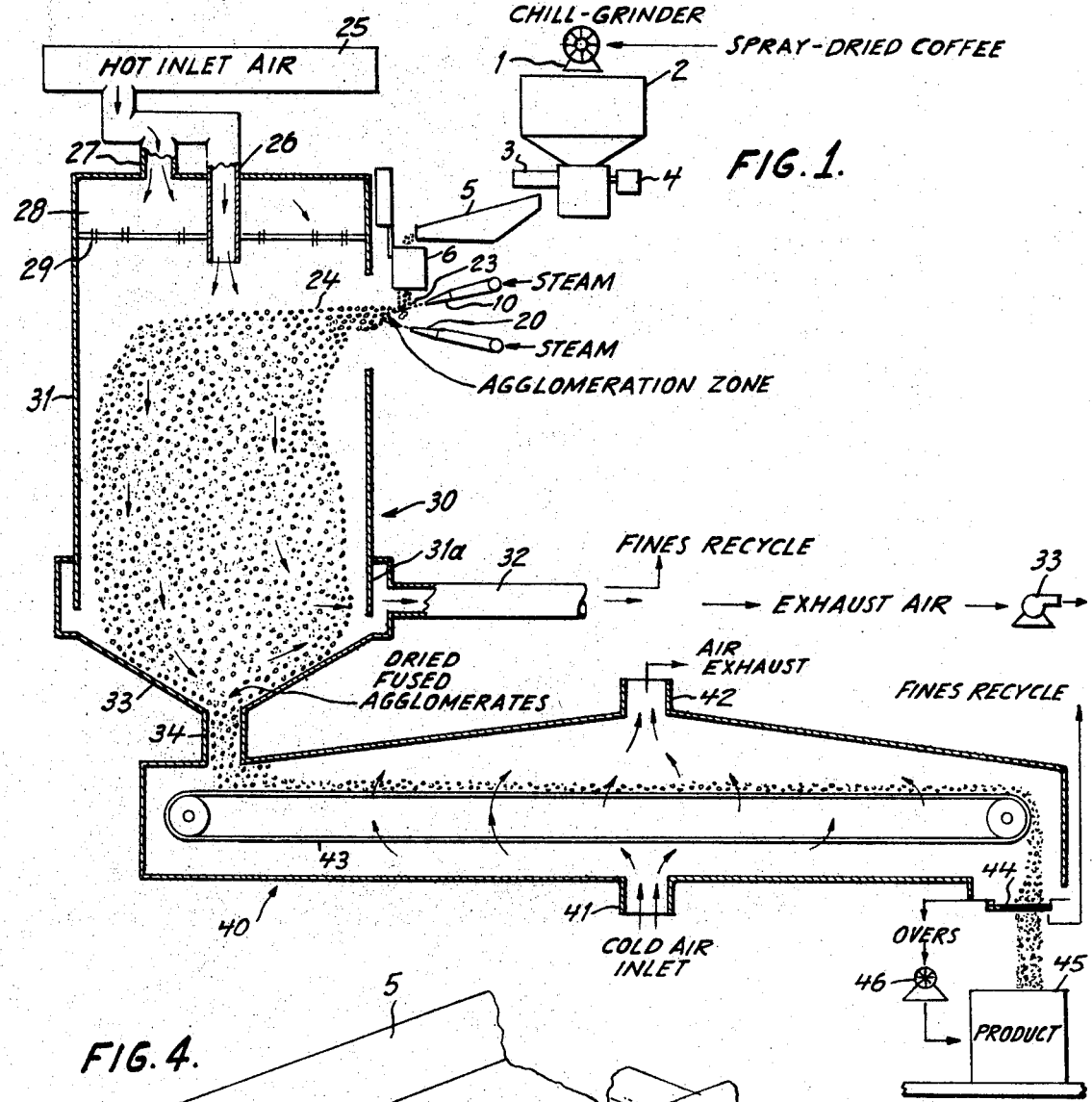
FIG. 1 is a schematic view of the agglomerating process and the apparatus as used to form dried fused coffee agglomerates.

Referring to FIG. 1, the full process of this invention will be described schematically in regard to coffee, although other powdered materials can be agglomerated by the same process and apparatus. Soluble coffee powder, in the form of spray-dried coffee having an initial moisture content of 2–4%, is first conditioned in chill-grinder 1 wherein the coffee is ground to a particle size of at least below 120 microns, and chilled to below 80° F. Grinding increases the point-to-point contact of the coffee and is the major means of controlling product density and appearance since it has been found that as coffee is ground to a particle size distribution wherein substantially all particles are below 120 microns and at least 50% (by weight) are below 15 microns a speckled appearing product (which looks like roasted and ground coffee) is produced. At particle size distributions of below 120 microns, but at least 50% by weight) of the particles are above 20 microns a non-speckled product is obtained. At particle size distributions in between those recited, a product which is only partially speckled is obtained. Chilling aids uniform wetting of the coffee due to increased condensation of steam on the particles. Liquid nitrogen, $CO_2$, or other refrigerant can be used to chill the grinder 1. The conditioned coffee powder then enters a hopper 2 which has an auger feed 3 driven by motor 4 supplying vibratory trough 5 with a constant stream of coffee powder which is transferred into a distributor box 6 having parallel slits therein for supplying vertical curtains of coffee to two separate levels of steam (from rows of nozzles 10 and 20).

If a stronger, darker agglomerate is desired the soluble coffee can enter the chill grinder 1 at a higher initial moisture in the range of 5–6%. This can be done by either prewetting the soluble coffee, by drying the soluble coffee to a higher terminal moisture in the drying stage, or by passing the soluble coffee through an agglomeration operation wherein coffee is not only prewet but agglomerated without being exposed to fusion or drying temperatures. The prewet coffee in either agglomerated or non-agglomerated form can then be fused and dried by exposure to high inlet air temperatures without being degraded.

The conditioned coffee can be fed at a powder rate of roughly 30–60 lbs./hour per slit in the feed box while steam is supplied at a rate of 75–125 lbs./hour per nozzle used. The total powder rate for an agglomerating chamber 30 can vary depending on size and design of the unit and may be adjusted to give a steam:powder ratio of about 0.4:1 to 1.2:1, preferably 0.6:1 to 1.0:1. At higher steam ratios too much moisture is applied to the product and the drying air (thus hurting drying capacity) while at lower steam ratios good wetting of the coffee is not achieved (forming weak agglomerates). Steam at the above rate can be supplied to the double row of nozzles at a pressure of 5 to 30 p.s.i.g., preferably 8–20 p.s.i.g. Higher steam pressures (above 35 p.s.i.g.) cause excessive shearing action thus hurting agglomerate formation while lower steam pressures (below 5 p.s.i.g.) will not redirect or sufficiently disrupt the falling curtain of powder.

Steam from the upper nozzles 10 intersects and disrupts the curtains of coffee powder to form agglomerates 24, some of which are desired in the process and others which are less desirable. The second row of steam nozzles 20 positioned directly underneath, preferably in front of the first row of nozzles, serve to project the wet agglomerates and, more importantly, serve to break up and further wet the large, insufficiently wet, weak agglomerates formed by the first steam pipe. All the agglomerates 24 are then projected a sufficient distance into agglomerating chamber 30.

The agglomerating chamber 30, which may be round or rectangular in design and of sufficient diameter and height to allow for both fusion and drying of the particles in said chamber is supplied with hot air for fusing and drying the agglomerates. Typically, the chamber 30 is at least 7 feet in diameter to avoid plastering of the walls and at least 20 feet in height to allow sufficient drying time for the falling particles to dry.

For a chamber of 12 feet in diameter and 30 feet in height and an initial moisture content in the powder feed of 2–4%, heated air can be supplied at 400° to 600° F. and a rate of 2,000 to 5,000 c.f.m. from hot air inlet chamber 25 via a center duct 26 and via duct 27 which feeds heated air into plenum chamber 28. The proportion of air coming through center duct 26 and duct 27 can be adjusted by a damper (not shown). A majority of the heated air (now at a temperature of 350° to 500° F.) comes out center duct 26 and contacts the wet agglomerates which have been projected into the agglomerating chamber along with a substantial draft of ambient air from outside of the chamber (which serves to lower the temperature of the hot air from duct 26). The advantage of the center duct 26 is that it allows hot air, at a relatively high temperature suitable for fusion, to be introduced into the middle of the chamber after the agglomerates have had a chance to be sufficiently wet (and fusion has been initiated) by the double row of steam nozzles. If enough hot air at above 350° F. is introduced adjacent the steam zone, it evaporates and dries the steam before it sufficiently wets the coffee agglomerates to a point sufficient for fusion. However, some air, say 10%–50%, can be introduced through holes 29 in the plenum 28 so that a co-current flow of heated air with the wet agglomerates 24 is formed inside chamber 30. The agglomerates are fused at a product temperature of 100° to 250° F. due to the combined action of the hot steam and heated air giving a temperature of about 300° to 500° F. in the upper one-half portion of chamber 30. The particles are then dried as they fall through the chamber by gravity in a co-current pattern with the drying air which exits through exhaust duct 32 at a milder drying temperature of 150° F. to 300° F., due to the action of exhaust fan 33. Milder drying temperatures are necessary to avoid flavor degradation due to the lower moisture content of the agglomerates after fusion.

With a higher moisture powder feed in this same chamber, say 5–6% moisture coffee rather than 2–4%, it has been found that the powder when wet and agglomerated can be exposed to inlet air temperatures which exceed 500° F. and as high as 600° F. thus giving quicker and easier fusion of the product and a stronger darker agglomerate. However, with the usual powder feed (at 2–4% moisture) the wet agglomerates cannot be exposed to inlet air temperatures above 500°–525° F. since the air then dries the surface moisture too rapidly and hurts the flavor of the coffee while at inlet air temperatures below 300° F. it is quite difficult to obtain any substantial amount of fusion.

Removal of dried agglomerates with the exhaust air is minimized due to baffle 31a which extends in a downward direction into exhaust duct 32. Exhaust air exits from the dryer at a rate sufficient to maintain the above dryer conditions with a slight negative pressure in the chamber 30. The dried agglomerates contact wall 33 which is relatively cool and then fall through discharge duct 34 into a cooling tunnel 40. There is some inlet of cold air through duct 34 into the bottom of chamber 30 which can vary from 800 to 1,500 c.f.m., usually 1,000–1,200 c.f.m.

Cooling tunnel 40 employs a conveyer for carrying the warm agglomerates 24 in a thin bed which is cooled by a forced draft of cold air which enters inlet 41 and exits through outlet 42. This cooling step is necessary in order to cool the agglomerates to below 100° F., preferably below 80° F., properly set the fused agglomerates and prevent sticking or caking of the agglomerates prior to packaging. The cooled agglomerates are then passed through screen 44 in order to obtain the desired particle size distribution. Oversized agglomerates are removed and further ground in mill 46 and then combined with the product in container 45. Agglomerates which are too small (fines) are removed and used as recycle material for the chill-grinder along with the fines removed by the exhaust air in duct 32.

Figure 2:
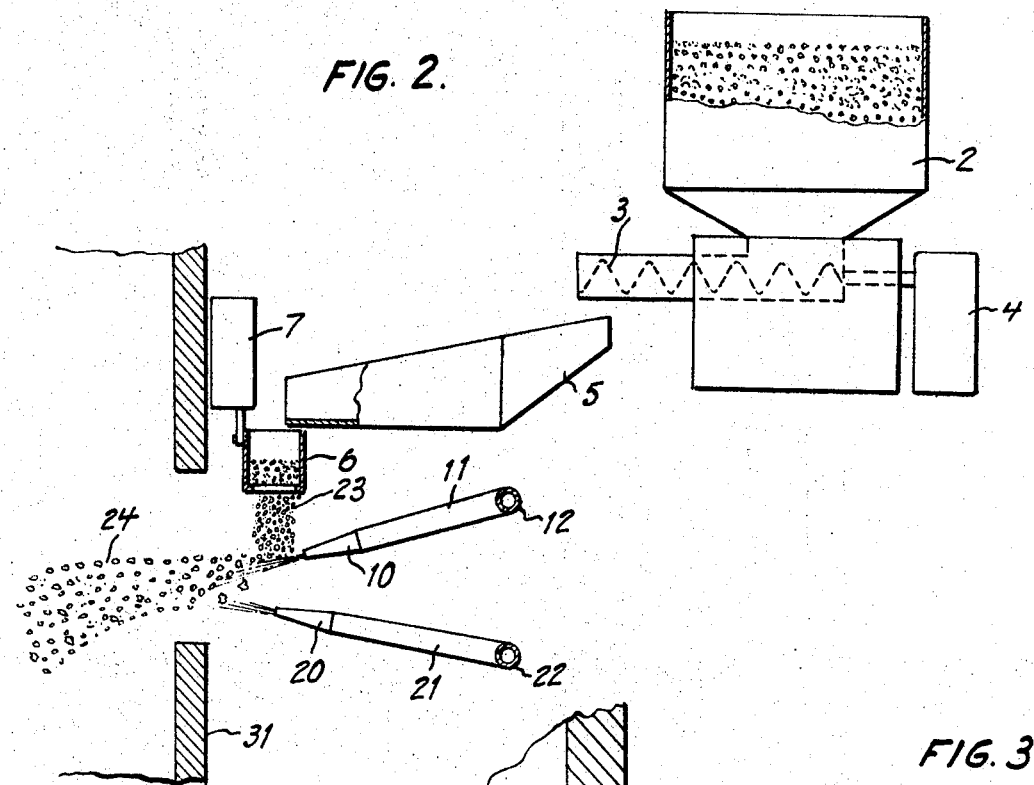
FIG. 2 is an enlarged side view of the upper and lower (double row) steam nozzles and the vibratory feeder showing the curtain of powder being contacted by the steam jets and projected into the agglomerating chamber.

Referring now to FIG. 2, the vibratory feeding means and the steam jets are shown in more detail. The chilled and ground coffee (ground to a size which will give either a speckled or non-speckled product) falls through slits in the box 6 as a series of vertical parallel curtains which are contacted by steam jets which impinge against the curtains at a substantial angle as more fully described in U.S. Pat. 2,977,203. It is understood that in lieu of a box with slits, a box with a screen could be used and a slit arrangement achieved by soldering or sealing alternate rows in the screen. In the present embodiment, the upper row of steam pipes 11 and nozzles 10 are slanted in a slight downward angle (say 10° to 20° from the horizontal plane) in order to achieve disruption of the curtain into agglomerates which are then wet with a minimum of horizontal projection of the agglomerates. Projection and further wetting of the moistened agglomerates 24 is left to the lower row of steam pipes 21 disposed at a slight upward angle (say about 5° to 10° with respect to the horizontal). The second row of steam nozzles 20 acts not only to project the agglomerates (which are merely clumps of dry coffee wet at the surface) formed by the steam from the first row of nozzles 10 and which, upon drying, would form weak agglomerates but also serves to breakup and further wet these clumps, thus giving stronger agglomerates.

Figure 3:
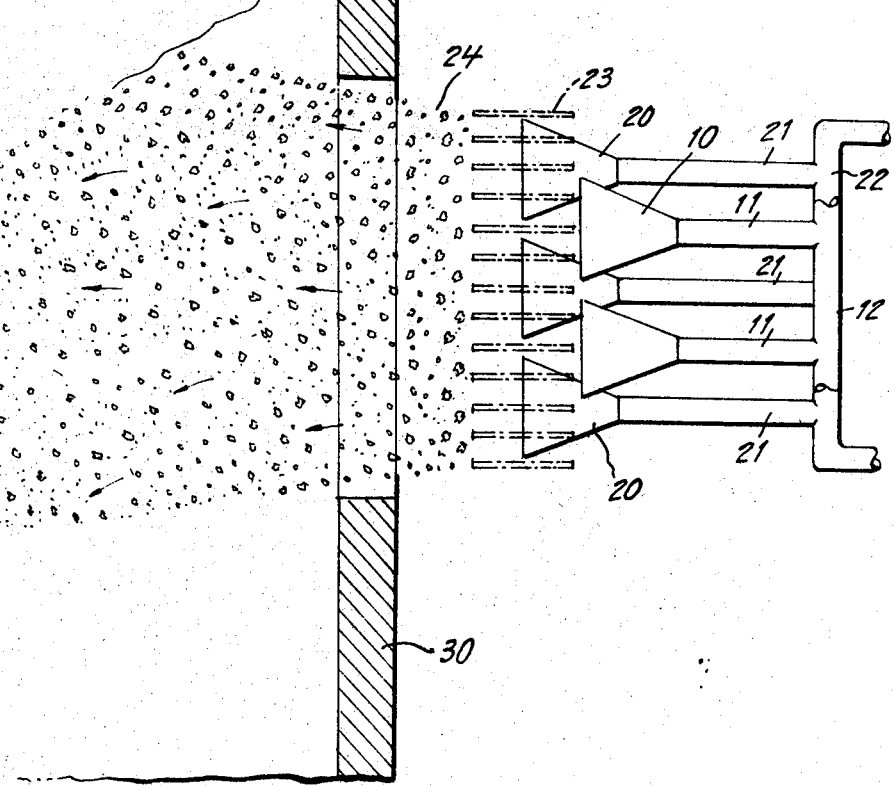
FIG. 3 is a top plan view which shows the horizontal arrangement of the upper and lower row of steam nozzles relative to the parallel curtains of powder and shows the agglomerated particles being projected into the agglomeration chamber.

FIG. 3 is a top plan view which shows the trajectory of the agglomerates 24 looking downward on the vertical parallel curtains 23 (formed by the parallel slits in the bottom wall 8 of the distributor box 6) as the curtains are contacted by the steam jets from the double row of steam pipes (upper row 11 and lower row 21). In this embodiment, the upper row has two steam pipes 11 with two steam nozzles 10 placed above a lower row of three steam pipes 21 having three steam nozzles 20 but the number of nozzles and slits can be increased proportionately depending on the capacity desired. The falling curtain 23 of coffee powder is disrupted by the horizontally directed steam jets released by the upper and lower nozzles 10 and 20 and the wet agglomerates 24 formed are projected into chamber 30 for fusion and drying.

The relative arrangement of the vibrating trough 5, the distributor box 6 and the double row of steam pipes, shown in FIGS. 1–3, can be seen perspectively in FIG. 4. In this view, the parallel slits 9 having a preferable dimension of ⅛ inch wide openings are shown in bottom wall 8 although narrower slits (1/16 inch wide) and wider slits (3/16 inch wide) work almost as well with some sacrifice in capacity or wetting, respectively. The steam for both nozzles 10 and 20 may be supplied from a common source or from different sources and may be at the same pressure or under different pressure, depending on the particular system employed. Also, the particular angle of the upper row of nozzles 10 and the bottom row of nozzles 20 can be varied as long as the nozzles are at a substantial angle with respect to the direction of travel of the curtain of powder and as long as steam issuing from the jets can be considered to be traveling in the same plane as the curtain of falling powder as described in the Sienkiewicz et al. patent. The second row of nozzles are usually positioned at a slight upward angle and serve to protect agglomerates already wet by the first pipe while further wetting these agglomerates and also serves to shear or disrupt large, dry agglomerates into smaller, better wet agglomerates. The top row of nozzles are set low enough (at a downward angle) to prevent wetting the bottom of the feed box. If they are set too low, the steam hits the curtains of powder from the feed box at a point where the curtains begin to spread and lower density, weaker agglomerates are formed. If the nozzles are set back too far, the velocity of the steam is spent before it hits the curtains of powder and the agglomerating effect is lost, the powder falls through the steam and is not conveyed in the steam jet. This results in poor wetting and insufficient agglomeration. The angle of the steam pipe can be varied slightly to decrease the horizontal trajectory of the agglomerates.

Figure 6:
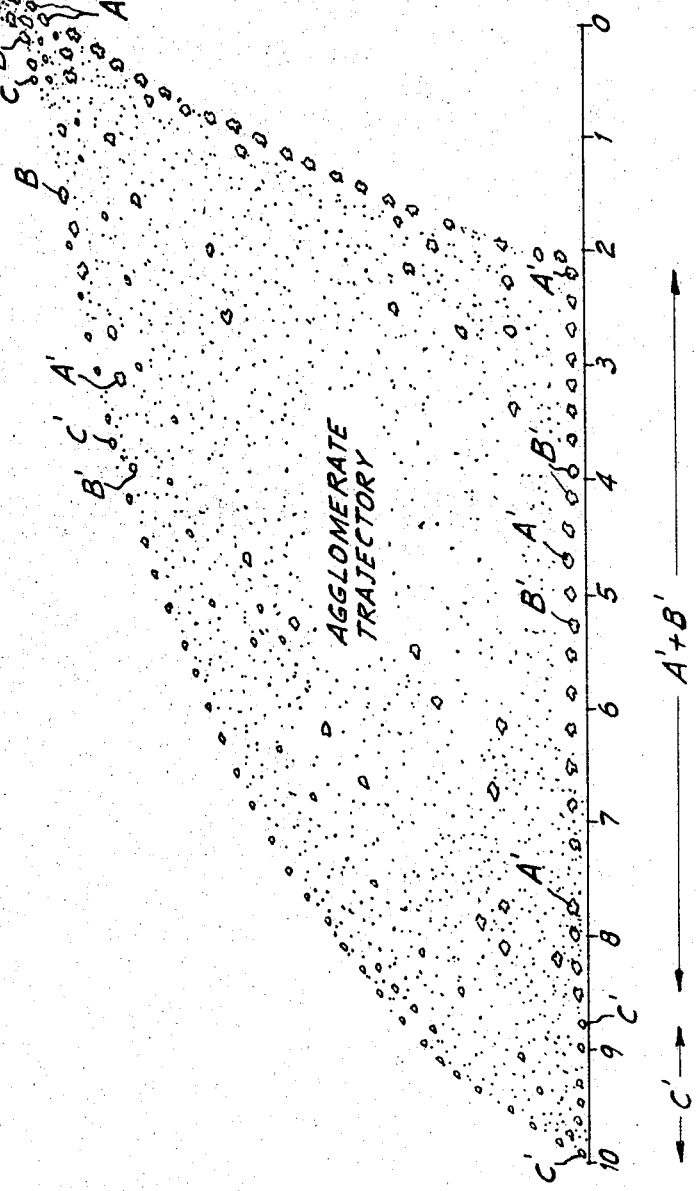
FIG. 6 is a side view which shows the trajectory of these agglomerates when using a lower jet of steam from a second row of nozzles directly beneath the first row of nozzles.

Referring now to FIGS. 5 and 6, the advantages of the double row steam agglomeration of this invention will be more fully realized. FIG. 5 is a sketch which represents the approximate trajectory of the particles which are agglomerated according to the single pipe principle of U.S. Pat. 2,977,203. It will be noted that the coffee powder is fed by a vibratory trough 5a into a distributor box 6a which is vibrated by air vibrator 7a. Coffee powder can be seen to fall in a vertical curtain 23a which is then contacted by a single jet of steam from nozzle 10a. The jet of steam can be considered to be in the same plane as the falling curtain 23a and intercepts the falling particles at a substantial angle to the direction of travel of said particles to agglomerate the particles and redirect the particles in substantially the same plane.

Agglomerates formed from this one jet of steam are distributed in front of the steam nozzle 10a a distance ranging from about one foot to as far as about 10 feet depending on the steam to powder ratio, the steam velocity and the angle of the steam nozzle. The larger agglomerates A fall out first, then medium sized agglomerates B, and then the smallest agglomerates C which travel the furthest. The first type of agglomerate A is large, sufficiently wet on the outside but dry on the inside. These particles fall in a short trajectory or relatively vertical path between the 1' and the 3' mark. The second type of agglomerate B is smaller in size and sufficiently wet and can be classified as being a desirable agglomerate in appearance, bulk density and strength. These particles will follow a trajectory which is less vertical and will fall somewhere between the 3' and 8' mark. The third type of agglomerate C is smaller, is sufficiently wet and strong and is projected the greatest distance. This agglomerate C follows a trajectory which falls between the 8' and 10' mark. It is understood that FIG. 5 is a pictorial description which simplifies the agglomeration operation for description purposes and that the large, medium and small agglomerates are actually distributed in some part throughout the entire trajectory scale. Also, the trajectory will change with the angle of the steam jets, their pressure, the powder feed, and other variables. In all cases, however, the particle size distribution with a single steampipe (or row of steampipes) and a single curtain of powder (or a plurality of curtains) will be the same in that heavy agglomerates insufficiently wet will fall first, followed by the medium agglomerates, and then followed by the smallest agglomerates.

Now, referring to FIG. 6 where a second steam nozzle 20a is placed beneath the first steam nozzle 10a, it can be seen that the agglomerates A, B and C are formed (as in FIG. 5) by the first steam jet disrupting the curtain and further acted upon by the second steam jet from nozzle 20a and that the steam from this nozzle serves not only to further wet the particles but serves to break up or shear the large, dry agglomerates A which would form defective agglomerates on drying due to insufficient wetting of the coffee powder inside the agglomerates. These large agglomerates are broken up into smaller agglomerates A′. In other words, the second steam nozzle 20a is disposed below the first steam nozzle 10a and in front of the nozzle 10a to contact a maximum of the agglomerates formed by the steam from the first nozzle. The large agglomerates A will now be broken up into small agglomerates A′ and further wetted in order to give a stronger agglomerate on drying. This is due to better wetting of the agglomerate, thus enabling better fusion of the agglomerate in the drying chamber. The smaller agglomerate A′ will be distributed throughout the agglomerate trajectory and will be mixed with the smaller agglomerates B which have been properly formed by the steam from nozzle 10a. As to agglomerates B, the lower steam jet from nozzle 10a only serves to further wet these particles to enable better fusion of these agglomerates B′ during their trajectory. As to the smaller particles C, the second steam jet has little effect on these agglomerates except for some further wetting of the particles for better fusion during the trajectory of these particles. Here also, the same trajectory of particles A, B, C, A′, B′ and C′ is involved whether one curtain 23a of powder is contacted by an upper steam nozzle 10a and a lower steam nozzle 20 or a plurality of vertical curtains similar to 23a are contacted by a number of nozzles similar to 10a in a single row followed by contact with a second row of nozzles similar to 20a.

DESCRIPTION OF THE PREFERRED EMBODIMENTS

This invention will now be described by reference to several specific examples which show the production of fused coffee agglomerates dried to a uniform size and density in accordance with this invention.

Example 1

Soluble coffee powder (obtained by spray-drying conventional coffee percolate with a solids content of 25–35%), having a particle size distribution of between 100–200 microns, a moisture content of about 2.5% and a density of 0.18 gm./cc. was ground in a hammer-mill of the Fitzpatrick type shown as a chill grinder 1 in the FIG. 1 drawing. During grinding, the powder was chilled by admission of liquid $CO_2$ to the grinding chamber, the liquid $CO_2$ cooling the chamber and powder as it sublimed. The powder left the chill grinder at a temperature close to 35° F. and particle size distribution wherein 100% of the particles were smaller than 100 microns, at least 90%, by weight, were smaller than 50 microns, and at least 50% of the particles were below 20 microns. The ground powder which now had a much lighter color than the starting material entered hopper 2 and was distributed by auger feed 3 onto the vibrating trough 5.

The ground and chilled powder which now had increased slightly in moisture content (to about 2.7% moisture) due to condensation and had a density of 0.50 gm./cc. was then fed into the vibrating box 6 having dimensions of about 12″ in length, 5″ in width and a height of about 4″, the box being equipped with 13 narrow slits 1/8″ wide and 2″ long spaced about 1/2″ from one another in a parallel relation. The chilled powder dropped by gravity through the parallel slits in the form of 13 parallel curtains dropping in a vertical direction or plane until redirected by the first steam jets from nozzles 10 and 20. The powder was fed at a rate of about 500 lbs./hour or roughly about 40 lbs./hour per slit while the steam was adjusted to achieve a 1:1 ratio of powder to steam by having each nozzle deliver about 100 lbs. of steam per hour. The first series of steam jets had a nozzle pressure of 14–16 p.s.i.g. and the steampipe was disposed at a downward angle of about 15° with respect to the horizontal plane, whereas the second steam pipe with nozzle 20 was disposed below the first row of nozzles 10 and slightly forward of these nozzles at an angle of about 7° with respect to the horizontal. The second series of steam jets had a pressure of about 12 p.s.i.g. The falling powder was agglomerated into agglomerates of different size, density and moisture content by the first series of jets and then further wet, redirected and made more uniform in density, size and moisture content by the second series of jets which assured that all of the wet agglomerates were redirected and projected about 5 to 8 feet into the middle of the agglomerating chamber 30 where the wet agglomerates were contacted by the inlet air (heated to 400° to 450° F.) and a minor amount of air through plenum chamber 28 and openings 29 serving to establish a co-current flow of heated air (at a rate of 2,500 c.f.m.) which assured fusion of the agglomerates 24 in the upper portion of the chamber prior to their being dried as the agglomerates fell a distance of at least 20 feet before contacting the relatively cool bottom walls 33 and exiting through duct 34 onto the conveyer belt 43 of the cooling tunnel. The drying air exited through duct 31 at a temperature of 260° to 280° F. and some cold air from the tunnel was sucked into the chamber at a rate of about 1,000 c.f.m. The warm agglomerates were further chilled by the cold air (50° F.) which entered through bottom duct 41 and exited through exhaust 42. The set agglomerates were then passed through a screen 44 to achieve a particle size distribution of between 5–40 mesh U.S. Standard Sieve with at least 50% of the particles being +20 mesh (U.S. Standard Sieve). The +5% mesh fraction was ground in mill 46 and added to the above while the fines fraction was recycled.

The final product was non-speckled, free-flowing, had a bulk density of 0.18 gm./cc., a moisture content of between 3.5 and 4% and the color of the material was about the same as that of the starting material.

Example 2

The process of Example 1 was followed with the exception that the coffee powder was ground to a size distribution of 100% less than 60 microns and at least 50% less than 15 microns.

This product had the same characteristics as the Example 1 product with the exceptions that this product was of slightly higher density (0.24 gm./cc.) and speckled in appearance.

Example 3

The procedure of Example 1 was followed with the exception that the inlet air was 600° F. and the coffee powder (after being ground in the chill-grinder) was pre-wet to a moisture content of 5–6% by blending the coffee with finely-ground ice.

This product was non-speckled, uniformly darker in color than the Example 1 product, and, more significantly, showed added agglomerate strength when subjected to packaging and shipping tests.

Example 4

The procedure of Example 3 was repeated with the exception that the coffee was not chilled during grinding.

The same product as in Example 3 was obtained.

Example 5

The procedure of Example 1 was followed with the exception that the coffee powder obtained from the spray-drying tower was dried to below 1.5% moisture. The product was ground in the chill-grinder and then agglomerated.

This product was non-speckled, lighter in color, but extremely weaker in agglomerate strength when subjected to packaging and shipping tests. The strength of these agglomerates was only slightly stronger than the non-fusion control of Example 1.

Example 6

The procedure of Example 1 was repeated with the exception that air was introduced from the sides of the chamber 30 instead of the top of the chamber at a position about 10 feet below the steam and agglomeration zone. At least 20 feet was allowed for drying of the agglomerates.

The product characteristics of these agglomerates were the same as the Example 1 product.

Example 7

The procedure of Example 1 was repeated with the same apparatus except that an additional steam agglomerator (composed of a box feeder 6 and steam nozzles 10 and 20) was placed on the opposite side of the chamber. Capacity was almost doubled by control of known variables.

The strength of the agglomerates over a control sample prepared under non-fusion conditions was shown by machine packaging of the product in jars and then subjecting the jars to shaking tests. Product prepared according to this example retained its agglomerate form whereas the non-fusion product did not.

While this invention has been described by reference to several specific embodiments, it is intended to be limited only by the scope of the appended claims.

What is claimed is:

1. In a process for producing dry, free-flowing, agglomerates of powdered food material by dropping said powder in the form of a continuous vertical curtain into a steam zone which forms wet agglomerates by horizontal redirection into a drying zone, the improvement which comprises introducing upper and lower jets of steam disposed at a substantial angle to one side only of said vertically moving curtain of powder at a steam pressure sufficient to form wet agglomerates, said upper jet of steam disposed at an angle sufficient to disrupt said curtain into wet agglomerates of varying size, density and moisture content and said lower jet of steam disposed below said upper jet of steam at an angle sufficient to further wet and redirect said wet agglomerates with a force sufficient to render the size, density and moisture content of said agglomerates more uniform, said lower jets redirecting the wetted agglomerates through an unobstructed space on the side of the powder curtain opposite to the steam jets, said redirected agglomerates then falling through a drying zone, hot air in said drying zone being circulated to reduce the moisture content of said wetted agglomerates.

2. The process of claim 1 wherein a plurality of spaced, vertically moving curtains of powder are impinged by upper and lower jets of steam of sufficient spread to disrupt said curtains into wet agglomerates and then redirecting all of said wet agglomerates from the steam zone into the drying zone.

3. The process of claim 2 wherein the powder is soluble coffee ground to a particle size wherein 100% of the particles are smaller than 120 microns.

4. The process of claim 3 wherein the ground coffee is chilled to below 80° F. prior to agglomeration.

5. The process of claim 4 wherein the ground-chilled coffee is agglomerated at a steam to powder ratio in pounds per hour of between 0.4:1 and 1.2:1.

6. The process of claim 5 wherein the steam pressure is 5–30 p.s.i.g.

7. The process of claim 6 wherein the agglomerates fuse at a product temperature of between 100° and 250° F.

8. The process of claim 7 wherein agglomeration is achieved with 2–6% additional moisture added to the surface of the coffee particles to give a wet agglomerate of 5 to 10% total moisture.

9. The process of claim 8 wherein the drying air is at a temperature of 300° to 600° F. when contacting the wet agglomerates, the agglomerates are fused and then dried at an air temperature of 150° to 300° F.

10. The process of claim 9 wherein the dried agglomerates are cooled to a temperature of below 80° F. to set the agglomerates.

11. The process of claim 10 wherein a speckled product is obtained by grinding the coffee to a particle size distribution wherein at least 50% by weight of the particles are below 15 microns.

12. The process of claim 10 wherein a non-speckled product is obtained by grinding the coffee to a particle size distribution wherein at least 50% by weight of the particles are above 20 microns.

13. The process of claim 10 wherein the soluble coffee has 2–4% moisture, the coffee is agglomerated at a steam to powder ratio in pounds per hour of between 0.6:1 to 1.0:1 and a steam pressure of 5–30 p.s.i.g., fused by contact of wet agglomerates with hot air at a temperature of 300° to 500° F., and then dried by air at a temperature of below 300° F.

14. The process of claim 13 wherein the soluble coffee has an initial moisture content of 5–6%, the coffee is ground, chilled and then fusion-agglomerated by contact with air at a temperature of 500° to 600° F.

15. The process of claim 14 wherein the intial moisture is achieved by pre-wetting the coffee.

16. The process of claim 14 wherein the initial moisture is achieved by drying the soluble coffee to the higher terminal moisture.

17. The process of claim 14 wherein the initial moisture is achieved by agglomerating said coffee to said moisture.

References Cited

UNITED STATES PATENTS

| | | | |
|---|---|---|---|
| 2,832,686 | 4/1958 | Louder | 99—Aggl. Dig. |
| 2,893,871 | 7/1959 | Griffin | 99—Aggl. Dig. |
| 2,921,854 | 1/1960 | Parker | 99—Aggl. Dig. |
| 2,977,203 | 3/1961 | Sienkiewicz | 23—313 |
| 3,143,428 | 8/1964 | Riemers | 99—Aggl. dig. |
| 3,445,247 | 5/1969 | Baerwald | 99—199 |

FRANK W. LUTTER, Primary Examiner

W. L. Mentlik, Assistant Examiner